United States Patent [19]

Katsumori et al.

[11] 3,825,951

[45] July 23, 1974

[54] MAGNETIC DISC MEMORY

[75] Inventors: Toshio Katsumori; Shu Kawakami; Isamu Kobayashi, all of Odawara, Japan

[73] Assignee: Kogyo Gijutsuin, Tokyo, Japan

[22] Filed: Nov. 20, 1972

[21] Appl. No.: 307,902

Related U.S. Application Data

[63] Continuation of Ser. No. 110,156, Jan. 27, 1971, abandoned.

[30] Foreign Application Priority Data

Feb. 6, 1970 Japan .................................. 45-9919

[52] U.S. Cl. .................................................. 360/133
[51] Int. Cl. ........................................... G11b 23/02
[58] Field of Search ............................... 340/171.1 B

[56] References Cited

UNITED STATES PATENTS 3,177,493 4/1965 Dorlotsky ........................ 340/174.1
3,258,756 6/1966 Domich et al. .................. 340/174.1
3,710,357 1/1973 Buslik ............................. 340/174.1

*Primary Examiner*—Vincent P. Canney
*Attorney, Agent, or Firm*—Pollock, Philpitt & Vande Sande

[57] ABSTRACT

A magnetic disc memory apparatus having a multiplicity of fins secured to a base which supports a motor, a spindle carrying a disc pack, a carriage carrying magnetic head supporting means and an actuator for the carriage. The fins are disposed in the path of externally drawn air so as to minimize the difference between the temperature of the base and the temperature of the disc pack.

1 Claim, 8 Drawing Figures

TOSHIO KATSUMORI
SHU KAWAKAMI
ISAMU KOBAYASHI INVENTOR

BY

Hall, Pollock & Vande Sande ATTORNEY

TOSHIO KATSUMORI
SHU KAWAKAMI
ISAMU KOBAYASHI
INVENTOR
BY
Hall, Pollock + Vande Sande
ATTORNEY

MAGNETIC DISC MEMORY

This is a continuation of application Ser. No. 110,156, now abandoned, filed Jan. 27, 1971.

BACKGROUND OF THE INVENTION

1. Field of the Invention

This invention relates to a magnetic disc memory apparatus having means for minimizing the relative displacement in the position of a magnetic head and a track on an associated magnetic disc.

2. Description of the Prior Art

In a magnetic disc memory apparatus, the relative displacement in the position of a magnetic head and a track on an associated magnetic disc is generally an important problem which must be solved for improving the density of recording in the radial direction of the magnetic disc. Contraction and expansion of parts constituting the magnetic disc memory apparatus due to variations in the temperature of these parts is one of the factors causing such relative displacement. More precisely, a temperature rise generally occurs in the magnetic disc memory apparatus due to the heat generated by elements such as a motor, a spindle and an actuator or due to a rise in the temperature of the room in which the magnetic disc memory apparatus is operated. The temperature rise results in thermal expansion of parts constituting the magnetic disc memory apparatus, hence in a relative displacement in the position of a magnetic head and a track on an associated magnetic disc due to the difference between the coefficients of linear expansion of different materials forming these parts.

As shown in FIG. 1, the relative displacement in the position of a magnetic head 5 and a track on an associated magnetic disc 2 results from the difference between the temperatures of a magnetic head supporting means 1 supporting the magnetic head 5, the magnetic disc 2 and a base 4 supporting these parts or the difference between the coefficients of linear expansion of different materials forming these parts.

During the normal operation of the apparatus, except the transient period immediately after the operation of the apparatus is started, the temperature of the magnetic head supporting means 1 is substantially equal to that of the magnetic disc 2, and the relative displacement $\delta$ in the position of the magnetic head 5 and the track on the magnetic disc 2 relative to the temperatures of various parts of the apparatus is given by the following equation:

$$\delta = l_1\alpha_1(t_1 - t_0) - (l_2\alpha_2 + L_3\alpha_3)(t_2 - t_0) = l_1\alpha_1(t_1 - t_2) + (l_1\alpha_1 - l_2\alpha_2 - l_3\alpha_3)(t_2 - t_0)$$

where $l_1$ is the distance between the vertical axis la of a carriage carrying the magnetic head supporting means 1 and the axis 3 of the magnetic disc 2, $l_2$ is the distance between the axis 3 of the magnetic disc 2 and the magnetic head 5, $l_3$ is the length of the arm of the magnetic head supporting means 1, $\alpha_1$ is the coefficient of linear expansion of the base 4, $\alpha_2$ is the coefficient of linear expansion of the magnetic disc 2, $\alpha_3$ is the coefficient of linear expansion of the magnetic head supporting means 1, $t_1$ is the temperature of the base 4, $t_2$ is the temperature of the magnetic disc 2 and the magnetic head supporting means 1, and $t_0$ is a reference temperature, that is, a temperature at which $\delta=0$ when $t_1 = t_2 = t_0$. In the above equation, $(l_1\alpha_1 - l_2\alpha_2 - l_3\alpha_3)$ in the second member can be made substantially zero by suitably selecting the material of the parts. Therefore, the relative displacement $\delta$ in the position of the magnetic head 5 and the track on the magnetic disc 2 has a very small value and is kept constant when the difference between $t_1$ and $t_2$ has a small value and is kept constant.

Referring to FIG. 2 showing the structure of a prior art magnetic disc memory apparatus, a motor 6 is disposed beneath a base 4 and the driving power developed by the motor 6 is transmitted to a spindle 10 through a power transmission mechanism including pulleys 7 and 8 and a belt 9 trained around the pulleys.

The spindle 10 extends through the base 4 and carries a disc pack 12 on its central axis 3 to rotate the disc pack 12 at high speed. One magnetic head 5 is disposed opposite to one surface of each magnetic disc 2, and a magnetic head supporting means 1 supports each magnetic head 5. The magnetic head supporting means 1 are carried by a carriage 13 which is movable to and fro for accurately positioning each magnetic head 5 relative to a track on the associated magnetic disc 2. The carriage is, which functions to accurately position the magnetic heads 5, contains means including circuits, for the write-in and read-out of information. The movement of the carriage 13 is controlled by a hydraulic actuator 14. During the operation, air inhaled into the apparatus due to the pumping action of the disc pack 12 rotating at high speed flows through the apparatus to cool the same. More precisely, air inhaled through an air purifying filter 15 flows into the disc pack 12 via the space around the spindle 10. The air passes through the carriage 13 and the actuator 14 to be finally discharged outwardly from the apparatus as shown by the arrow 20. In such a prior art apparatus, the temperature of the base 4 rises due to the heat generated by the elements including the motor 6 and the spindle 10 at the time of the starting of operation of the apparatus. The temperature of air rises due to contact with the base 4 during the flow of air inhaled through the air filter 15 toward the space around the spindle 10, but this temperature rise is very slight. Further, the temperature of air flowing through the disc pack 12 rises slightly due to the frictional contact with the disc surfaces, but the temperature of this air is considerably lower than that of the base 4.

The temperature of the disc pack 12 and the magnetic head supporting means 1 is substantially equal to the temperature of air flowing therethrough, but it is not equal to the temperature of the base 4. Therefore, the temperature of the disc pack 12 and the magnetic head supporting means 1 is substantially dependent upon the temperature of the room in which the apparatus is placed. Thus, at the time of starting of the operation of the magnetic disc memory apparatus, the temperature of the magnetic head supporting means 1 and the disc pack 12 differs greatly from the temperature of the base 4, and a constant temperature difference therebetween is finally reached with the lapse of time. If this temperature difference is always constant, this difference may be taken as a reference for accurately positioning the magnetic head 5 relative to a track on the magnetic disc 2.

However, the prior art magnetic disc memory apparatus has been defective in that a considerable period of time is required until this temperature difference reaches a constant value. In other words, a considerable period of time has been required until the relative displacement in the position of the magnetic head 5 and the track on the magnetic disc 2 settles down at a constant value, and it has been impossible to write and read information in and out of the magnetic disc 2 during this period of time. The prior art magnetic disc memory apparatus has also been defective in that it is unfit for recording with a high density due to such a large relative displacement.

SUMMARY OF THE INVENTION

With a view to overcoming the problems encountered with the prior art apparatus of this kind, it is a primary object of the present invention to provide a magnetic disc memory apparatus in which means are provided so as to positively make the temperature of air flowing into the disc pack approach the temperature of the base as much as possible.

In accordance with the present invention, there is provided a magnetic disc memory apparatus comprising a base supporting a motor, a spindle carrying a disc pack, a carriage for causing movement of magnetic heads relative to said disc pack, and an actuator for said carriage, a multiplicity of fins secured to said base in the path of externally drawn air, and means for supplying the stream of this air into said disc pack through said fins and said base for minimizing the difference between the temperature of said base and the temperature of said disc pack.

The present invention having the feature described above is advantageous in that the difference between the temperature of the base and that of the disc pack is quite small and such temperature difference reaches a constant value in a very short period of time. Therefore, the relative displacement $\delta$ in the position of the magnetic head and the track on the magnetic disc is quite small and the relative displacement $\delta$ reaches a constant value in a very short period of time so that an improvement in the recording density in the radial direction of the magnetic disc can be easily attained.

DESCRIPTION OF THE PREFERRED EMBODIMENTS

An embodiment of the present invention will now be described in detail with reference to FIGS. 3 and 4.

Figure 1:
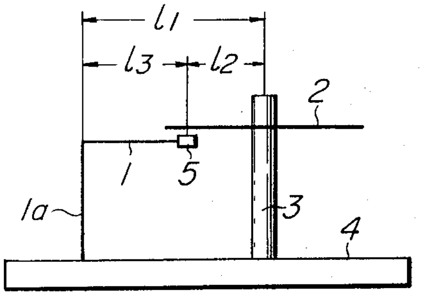
FIG. 1 is a diagrammatic view illustrating the relation between the temperature of parts of a magnetic disc memory apparatus and the relative displacement in the position of such parts.
Figure 2:
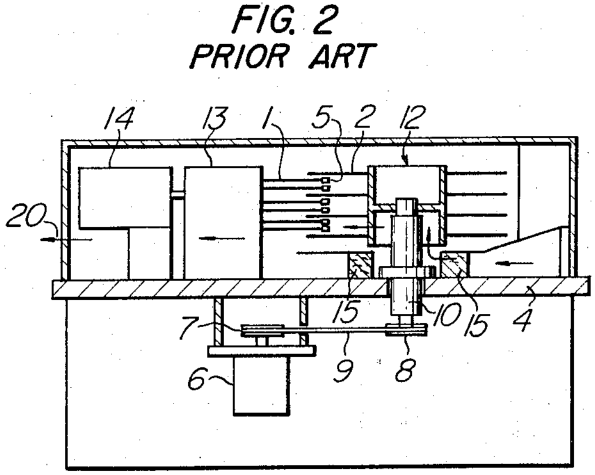
FIG. 2 PRIOR ART
FIG. 2 is a schematic sectional view of a prior art magnetic disc memory apparatus.
Figure 3:
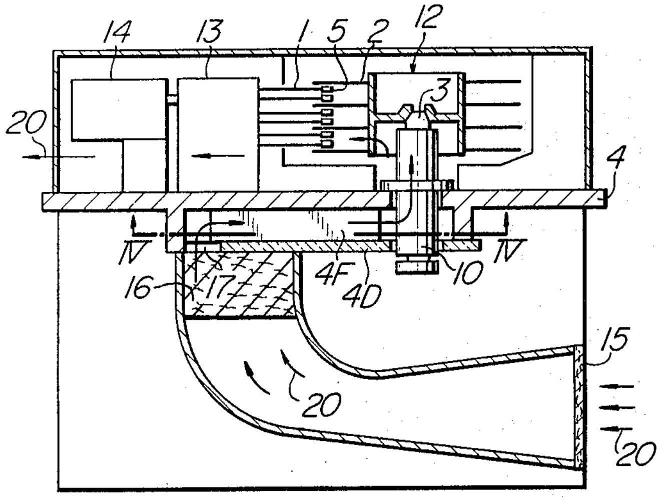
FIG. 3 is a schematic sectional view of an embodiment of the present invention.
Figure 4:
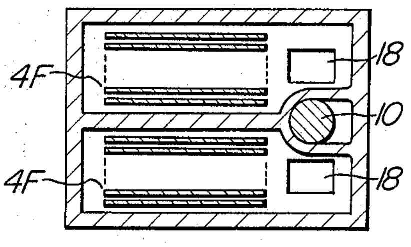
FIG. 4 is a partial plan view of the apparatus when viewed along the line IV—IV in FIG. 3.

Referring to FIG. 3 in which like reference numerals are used to denote like parts appearing in FIG. 2, a multiplicity of fins 4F are provided beneath a base 4. In FIG. 4 which is a partial plan view of the apparatus when viewed along the line IV—IV in FIG. 3, it will be seen that the fins 4F are parallelly disposed beneath the base 4F. The fins 4 are covered at their lower end by a cover member 4D of a heat insulating material, and an air passage 17 is provided so that a stream of air 20 drawn through a prefilter 15 and a main filter 16 passes the space between the fins 4F. A plurality of openings 18 are bored in the base 4 adjacent to a spindle 10 driven by a motor (not shown) so that the stream of air 20 can freely flow into a disc pack 12 mounted on the spindle 10.

The stream of air 20 drawn through the prefilter 15 flows through the main filter 16 and passes the space between the fins 4F disposed beneath the base 4 to reach the space around the spindle 10. The stream of air 20 is then forced through the openings 18 into the disc pack 12 by the high-speed rotation of the spindle 10 and passes through magnetic head supporting means 1, a carriage 13 and a hydraulic actuator 14 to be finally discharged to the exterior of the apparatus. The temperature of the stream of air 20 after having passed the space between the fins 4F secured to the base 4 is very close to the temperature of the base 4, and the temperature of the magnetic discs 2 and the magnetic head supporting means 1 is substantially equal to the temperature of the stream of air 20. Therefore, except the transient period immediately after the starting of operation during which period the temperature of the disc pack 12 approaches a level equal to the temperature of air flowing therewithin, the difference between the temperature of the base 4 and the temperature of the magnetic discs 2 and the magnetic head supporting means 1 can be maintained at a very small and substantially constant value irrespective of the temperature of the base 4 and the temperature of the room in which the apparatus is placed.

Another embodiment of the present invention will be described in detail with reference to FIGS. 5 and 6.

Figure 5:
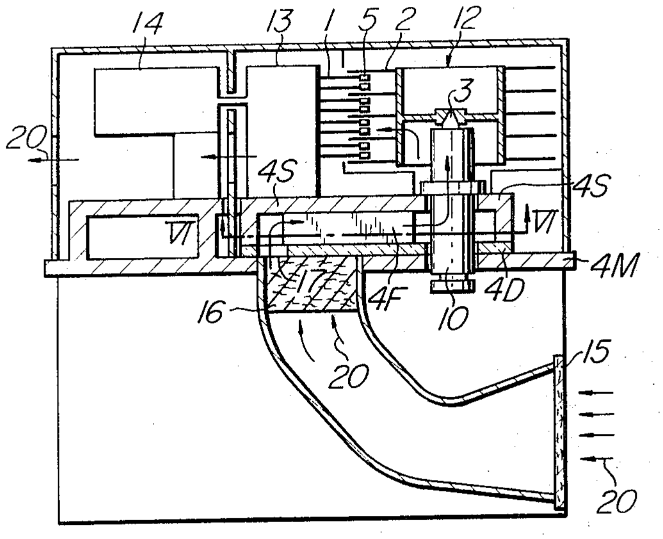
FIG. 5 is a schematic sectional view of another embodiment of the present invention.

Referring to FIG. 5 in which like reference numerals are used to denote like parts appearing in FIG. 3, a base 4 is composed of a sub-base 4S supporting a spindle 10 and a carriage 13 carrying magnetic head supporting means 1, and a main base 4M supporting a hydraulic actuator 14, a motor (not shown) and other elements. A sheet 4D of heat insulating material is interposed between the sub-base 4S and the main base 4M to thermally isolate the sub-base 4S from the main base 4M. A multiplicity of fins 4F are provided beneath the sub-base 4S as in the case of the preceding embodiment, and an air passage 17 is provided so that a stream of air 20 drawn through a prefilter 15 and a main filter 16 passes the space between the fins 4F.

Figure 6:
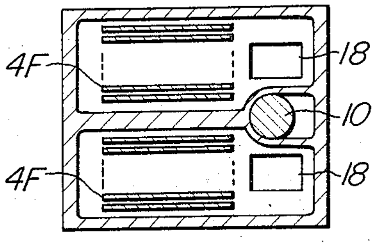
FIG. 6 is a partial plan view of the apparatus when viewed along the line VI—VI in FIG. 5.

FIG. 6 is a partial plan view of the apparatus when viewed along the line VI—VI in FIG. 5. It will be understood from FIG. 6 that the fins 4F are disposed substantially in parallel with one another beneath the sub-base 4S. A plurality of openings 18 are bored in the sub-base 4S adjacent to the spindle 10 so that the stream of air 20 having passed the space between the fins 4F can freely flow into a disc pack 12 mounted on the spindle 10.

The stream of air 20 drawn through the prefilter 15 flows through the main filter 16 and the passage 17 and passes the space between the fins 4F disposed beneath the sub-base 4S to reach the space around the spindle 10. The stream of air 20 is then forced through the openings 18 into the disc pack 12 by the high-speed rotation of the spindle 10 and passes through the magnetic head supporting means 1, carriage 13 and hydraulic actuator 14 to be finally discharged to the exterior of the apparatus.

The sub-base 4S is maintained at a temperature which is substantially free from the temperature of the main base 4M due to the interposition of the sheet 4D of heat insulating material between the sub-base 4S and the main base 4M. Further, the temperature of the stream of air 20 is very close to the temperature of the sub-base 4S due to the fact that the fins 4F are secured to the sub-base 4S, and the temperature of the disc pack 12 and the magnetic head supporting means 1 is substantially equal to the temperature of the stream of air 20. Therefore, except the transient period immediately after the starting of operation during which period the temperature of the disc pack 12 approaches a level equal to the temperature of air flowing therewithin, the difference between the temperature of the sub-base 4S and the temperature of the disc pack 12 can be maintained at a very small and substantially constant value irrespective of the temperature of the sub-base 4S and main base 4M and the temperature of the room in which the apparatus is placed.

Figure 7:
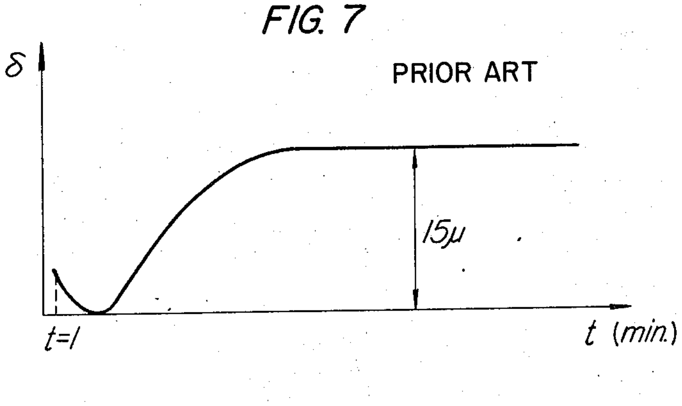
FIG. 7 PRIOR ART
FIG. 7 is a graph showing the relation between the relative displacement and the operation time in a prior art apparatus.
Figure 8:
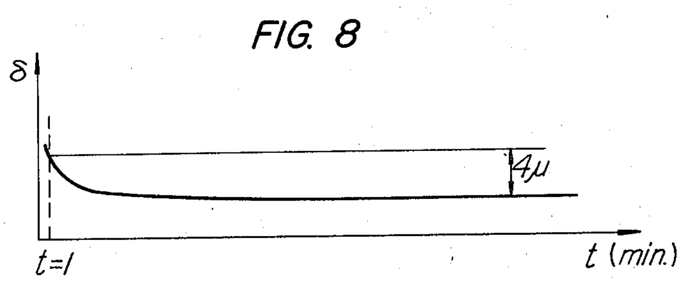
FIG. 8 is a graph showing the relation between the relative displacement and the operation time in an embodiment of the present invention.

FIG. 7 shows the relation between the relative displacement $\delta$ and the operation time in a prior art apparatus, while FIG. 8 shows the similar relation in an apparatus embodying the present invention. The curves were obtained by experiments. It will be seen from FIGS. 7 and 8 that the relative displacement $\delta$ reaches a constant value at an earlier time in the case of the apparatus of the present invention than in the case of the prior art apparatus and the relative displacement $\delta$ is reduced to a very small value of 4 $\mu$ in the apparatus of the present invention compared with a large value of 15 $\mu$ in the prior art apparatus.

We claim:

1. A magnetic disc memory apparatus comprising in combination:

a main supporting base member, a sub-base member which is thermally isolated from said main base member, a motor, a spindle carrying a disc pack and driven by said motor, a carriage carrying a plurality of magnetic heads and head supporting means for controlling movement of said magnetic heads relative to said disc pack, said main base member supporting said motor and said sub-base supporting said spindle and said carriage, a multiplicity of fins on said sub-base, means for conveying a stream of external air over said fins and thence into said disc pack and over said head supporting means, whereby the temperature of the disc pack is quickly brought to a value which is a small and substantially constant difference from the temperature of said sub-base so as to effect quickly upon initiation of operation of said apparatus a predetermined displacement between each magnetic head and its respective track or an associated disc.

* * * * *